United States Patent [19]

Harris

[11] 4,144,655

[45] Mar. 20, 1979

[54] PORTABLE STORAGE BIN

[75] Inventor: Harold D. Harris, Lubbock, Tex.

[73] Assignee: Harris and Thrush Manufacturing Company, Lubbock, Tex.

[21] Appl. No.: 888,950

[22] Filed: Mar. 22, 1978

Related U.S. Application Data

[62] Division of Ser. No. 718,903, Aug. 30, 1976, Pat. No. 4,104,850.

[51] Int. Cl.² ............ F26B 19/00; F26B 25/00; E04H 7/22
[52] U.S. Cl. ............................ 34/236; 98/55
[58] Field of Search ............ 34/236 L; 98/55

[56] References Cited

U.S. PATENT DOCUMENTS

| 3,726,024 | 4/1973 | Erwin | 34/236 |
| 3,798,791 | 3/1974 | Graber | 34/236 X |
| 3,942,267 | 3/1976 | van der Lely et al. | 34/236 |

Primary Examiner—Leonard H. Gerin
Attorney, Agent, or Firm—Wendell Coffee

[57] ABSTRACT

A portable grain bin has a V-shaped botton with right and left hand augers to move the grain to the center of the grain bin where an auger elevator lifts it to be discharged into a truck.

A perforated tube immediately above the augers in the bottom of the storage bin is connected to a fan on the storage bin so that dry air may be blown into the grain to dry the grain and keep it from heating. Wheels on the bin permit the bin to be moved from one field to an adjacent field, although when in use, the bin rests upon runners.

9 Claims, 7 Drawing Figures

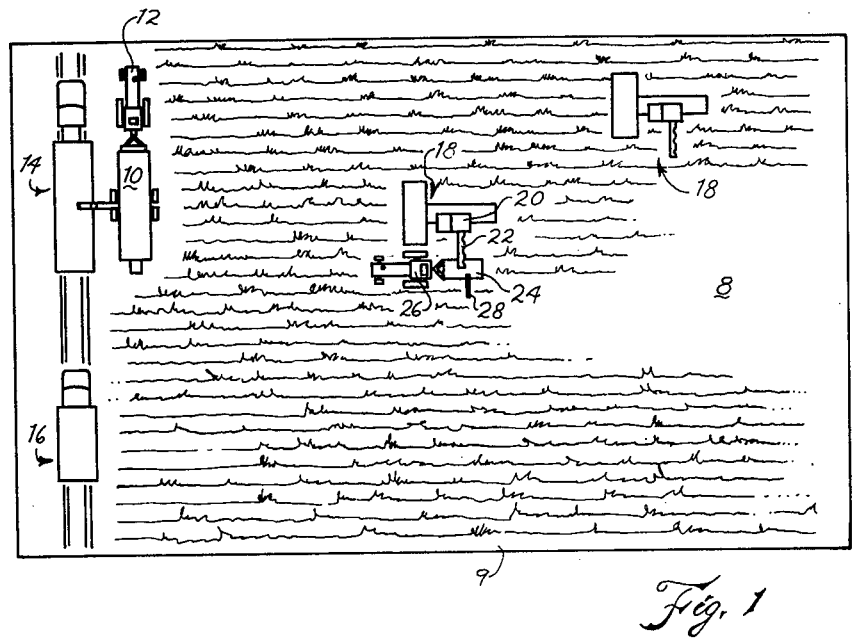
Fig. 1
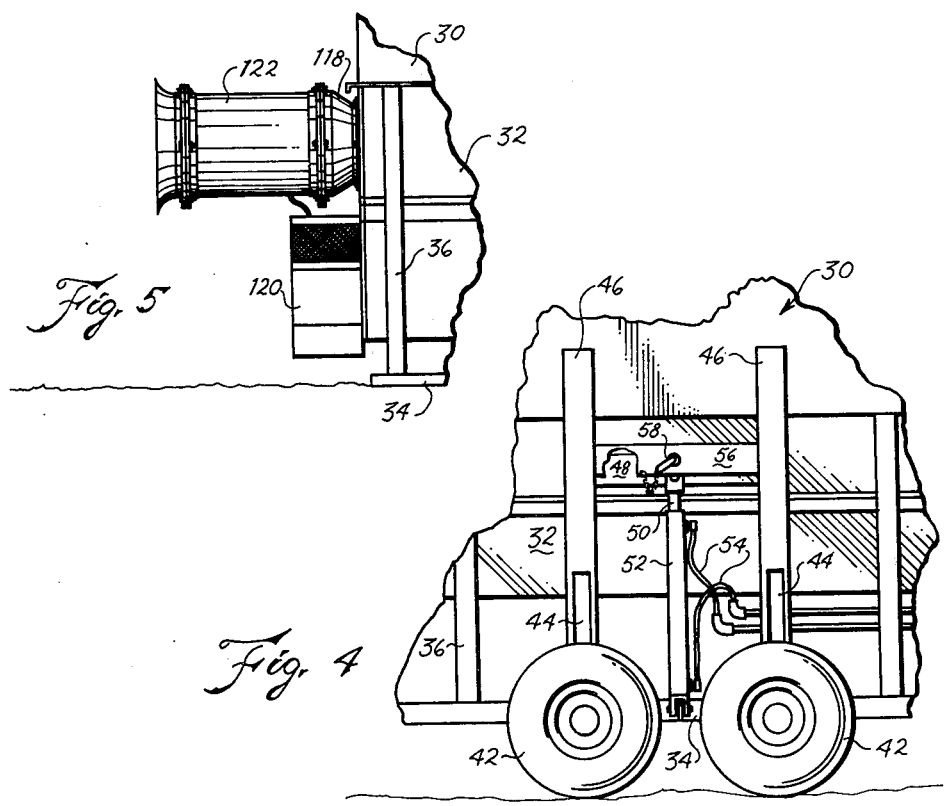
Fig. 5
Fig. 4

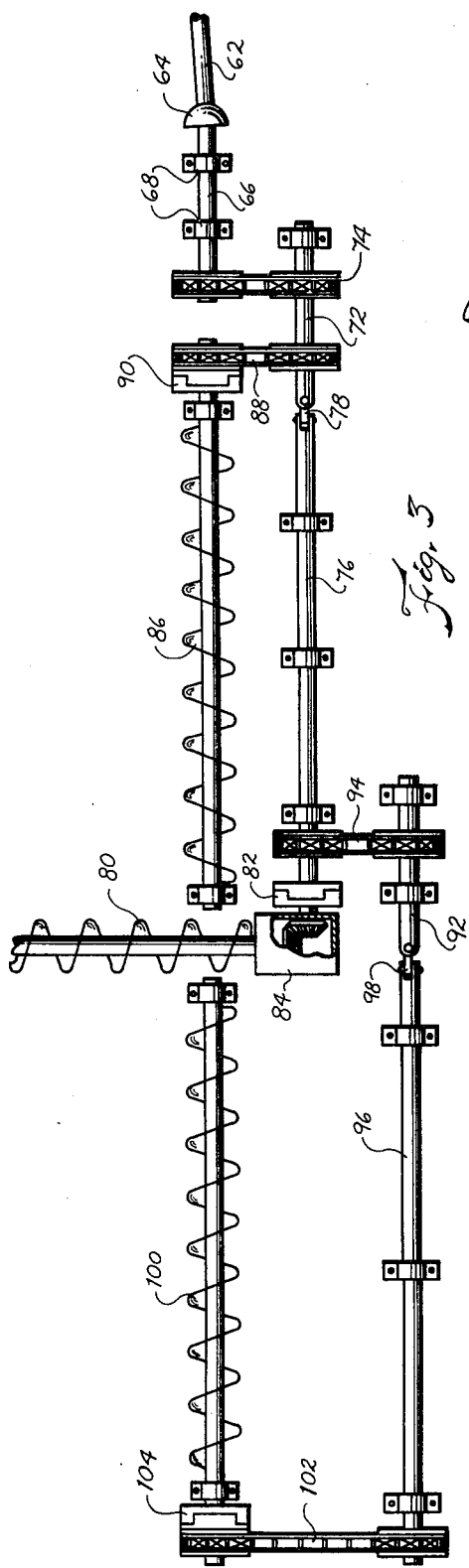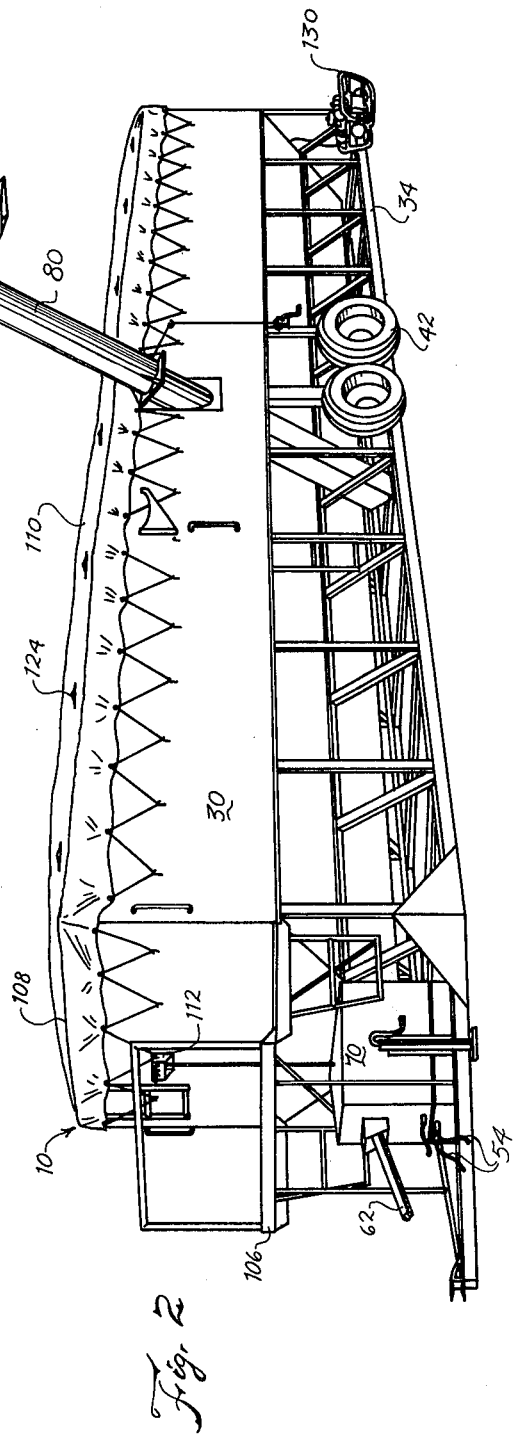

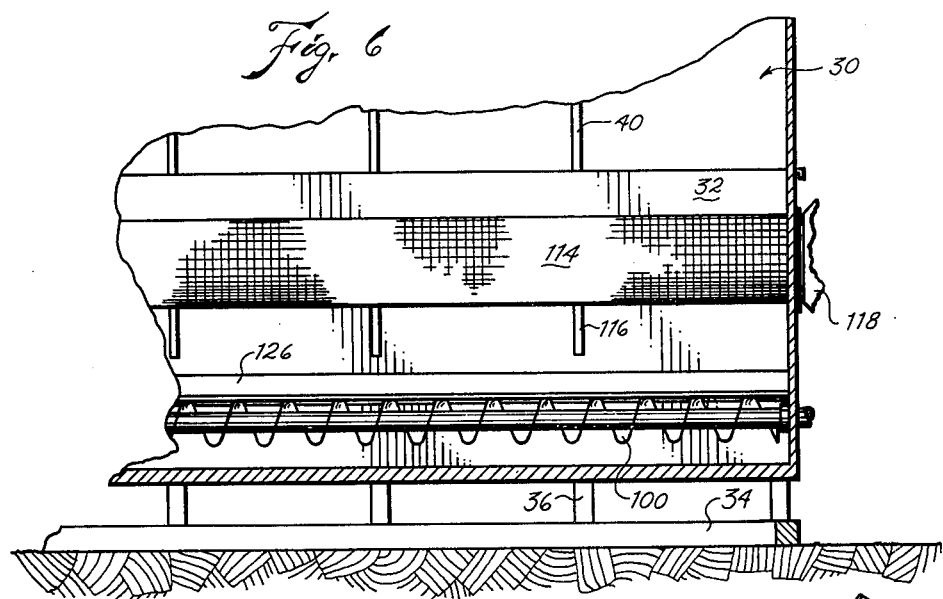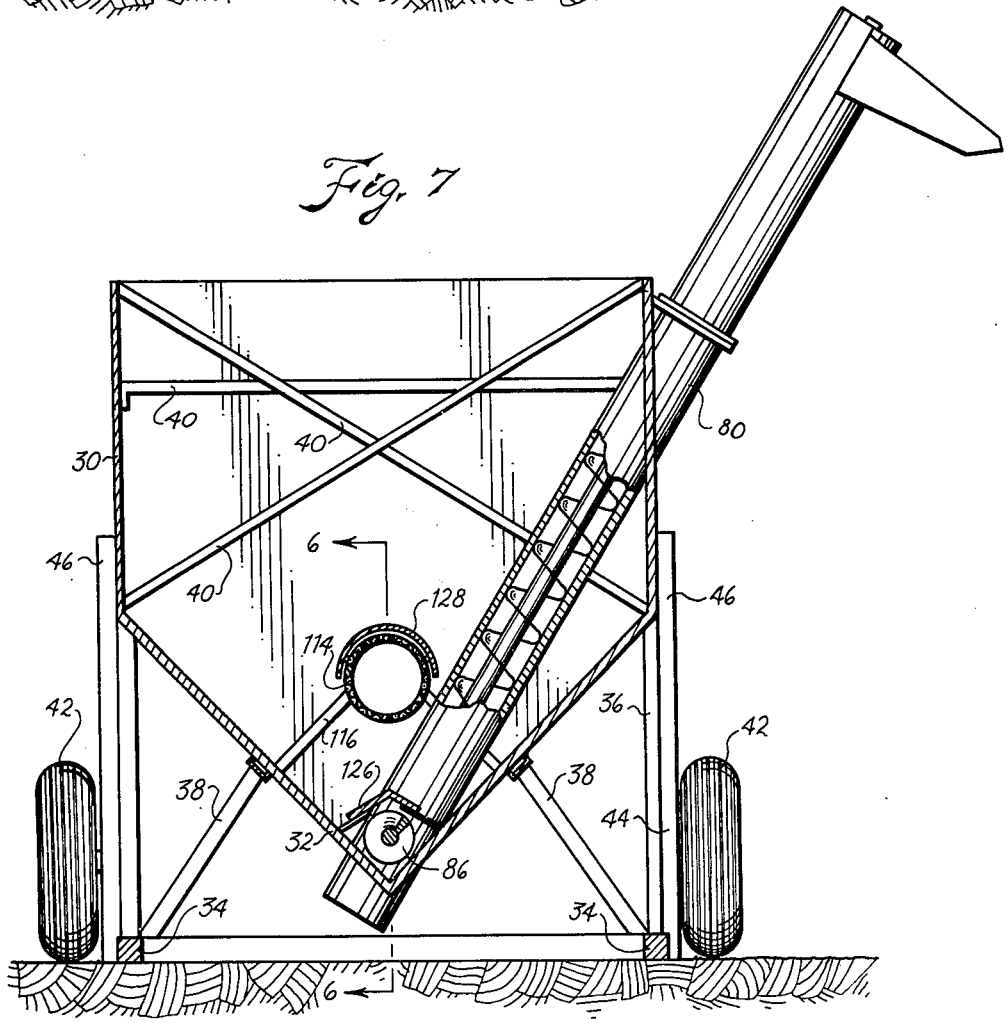

PORTABLE STORAGE BIN

CROSS-REFERENCE TO RELATED APPLICATIONS

This application is a division of my prior application Ser. No. 718,903, filed Aug. 30, 1976, now U.S. Pat. No. 4,104,850.

BACKGROUND OF THE INVENTION (1) Field of the Invention

This invention relates to agricultural harvesting and transporting crops to market, and, also, material handling from vehicles having elevators mounted thereon.

(2) Description of the Prior Art

Traditionally, grain is harvested by combines and the harvested grain collected in hoppers on the combine. The hoppers have augers on them and, traditionally, the grain is discharged from the combine into a small truck by which the grain is transported to an elevator.

According to my prior invention, U.S. Pat. No. 3,460,698, issued Aug. 12, 1969, a cart is advantageously used wherein the grain may be discharged from the combine into a grain cart, the grain cart having a capacity of two or three times greater than the combine hopper. Then, the grain was discharged from the grain cart by an elevator on the grain cart into trucks to be carried to the elevator.

ERWIN, U.S. Pat. No. 3,726,024, issued Apr. 10, 1973, discloses a portable drier wherein a grain drier is mounted upon a frame which is mounted upon wheels. Legs or jacks may be dropped from the frame to support the frame when in use.

SUMMARY OF THE INVENTION (1) New and Different Function

I have invented a portable grain storage bin and a method of using it to greatly increase the speed of harvesting without a corresponding increase in investment. Those familiar with agricultural harvesting will understand that grain combines have become extremely expensive. Also, large trailer-tractor rigs for hauling grain for long distances are expensive. Therefore, in harvesting grain, the harvester is reluctant to purchase or rent any more combines or large trucks than are essential, these representing major inventments. Also, since there is so much money tied up in combines and trucks, he does not wish for them to stand idle during the harvest season, but to continue to operate. It is desirable to avoid nonproductive time in loading and unloading the truck or combine or to have the truck empty and waiting for grain to be loaded into it or for having the combine idle because the hopper is full of grain and more grain cannot be harvested until facilities are available for unloading the hopper.

I have solved this problem by providing a portable grain storage bin so as to insure there is always storage space for grain from the combine hopper and, also, that there is always grain available from this storage space for the trucks. The storage bin itself need not represent an investment that is only used on one farm, but it too is mobile so that it can be used on different farms as are the combines and trucks. Briefly, the storage bin is mounted on skids and has retractable wheels. The wheels may be lowered to move the storage bin a few kilometers to another field on the same farm or to move to another farm nearby. Also, the storage bin is of such a size that it may be loaded upon a truck and moved several kilometers aboard the truck to a distant farm. In this regard it is quite similar to the combine itself, which may be moved under its own power for a few kilometers to another farm or which may be loaded onto a truck for moving to a distant farm.

The storage bin has a V-shaped bottom with an elevating auger at the midpoint of the length. At the bottom of the V-shaped bottom are a front and back conveyor to move the grain along the bottom to the elevating auger. The operator stands on a platform at the front of the bin adjacent to the tractor that furnishes the power to the unit. The tractor can be started and the power shaft to the storage bin started and then to unload grain, electric clutches are engaged by switches at the operating platform to start the elevator and one or the other of the bottom conveyors as needed. Thus, it only takes one person to operate the unloading functions of the storage bin.

A fan is mounted on the bin to dry and cool the grain, thus, permitting earlier harvest or, at least, no delay in harvest. A heater for additional drying may be added.

It will be noted that in addition to the grain bin greatly increasing the amount of grain harvested in a day's time without the tremendous increased cost of buying an additional combine and truck, no additional personnel is required to operate the additional combine and truck.

(2) Objects of the Invention

An object of this invention is to transport grain from harvest to elevator.

Further objects are to achieve the above with a device that is sturdy, compact, durable, simple, safe, efficient, versatile, and reliable, yet inexpensive and easy to manufacture, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a schematic plan view of a field with equipment as described in this application harvesting grain therein.

FIG. 2 is a perspective view of a grain storage bin according to this invention.

FIG. 3 is a schematic representation of the augers and the power drive therefor.

FIG. 4 is a side elevational detail of the wheel assembly for the storage bin with parts broken away for clarity.

FIG. 5 is a side elevational detail of the fan and other equipment located on the rear of the storage bin.

FIG. 6 is a partial longitudinal sectional view taken on line 6—6 of FIG. 7 showing the rear portion of the storage bin.

FIG. 7 is a cross sectional view with parts broken away for clarity showing the elevator auger.

DESCRIPTION OF THE PREFERRED EMBODIMENT

Referring to the drawing and more particularly to FIG. 1, there may be seen in somewhat schematic representation a portable grain storage bin 10 according to this invention. As may be seen, it is attached to power vehicle 12 (in the form of an ordinary agricultural tractor). This power vehicle 12 is used to transport the storage bin from one field 8 to a nearby field and, also, to provide power to the storage bin 10 while stationary as will be explained later.

As seen in the drawing, the storage bin 10 is discharging grain into wheeled road vehicle 14 (in the form of a semitrailer with tractor). Such a vehicle is well adapted to carry the grain economically for 1000 kilometers (600 miles) or so to port or place of use. Also, there may be seen another wheeled road vehicle 16 (in the form of a "bobtail" truck) waiting to be loaded from the bin 10, the vehicle 16 being suitable for carrying grain for up to 100 kilometers. These are the road vehicles normally used to transport the grain from the field where it is harvested to a nearby elevator. As shown in the drawing, the storage bin is located within the field 8, having boundaries 9, being harvested. I prefer to think of the storage bin being located at the field being harvested, by which I mean that it is either located within the boundaries 9 of the field 8 as shown in FIG. 1 or closely adjacent to it such as across a turnrow or within a few meters of the boundaries of the field.

The grain, of course, is harvested by combine 18, two of which are shown in the drawing. After the grain is harvested by the combine 18, it is accumulated within a collector or hopper 20 on the combine and is discharged from the hopper by harvester auger 22 into wheeled vehicle or grain cart 24. The grain cart 24 is basically as shown in my U.S. Pat. No. 3,460,698, issued Aug. 12, 1969, which is, itself, pulled by towing vehicle 26. The grain cart 24 has cart elevator 28. There is equipment located on the grain cart 24 for transferring the crop from the grain cart. Therefore, it may be seen that by the use of the grain cart, it is almost never necessary to have the combines 18 idle because the hopper 20 thereon is full nor is it hardly ever necessary to have the trucks 14 or 16 idle because there is not sufficient grain to fill them. The combines will be idle for certain periods late at night and early morning because of the moisture conditions of the grain; also, the trucks will be idle at times in the late afternoon and evening because of the crowded conditions at the elevator during harvest times.

The bin 10 is not meant to be a permanent storage. The grain in bin 10 is meant to be moved out of the bin within 12 hours in normal operation. Thus, grain placed in the bin at 10:00 pm is expected to be out of the bin by 10:00 am the following day.

Referring more particularly to FIG. 2, there may be seen a general view of the grain bin 10. Bin proper 30 has a general V-shaped bottom. From FIGS. 1 and 2, it will be seen that the bin 30 is a structure having a length of several times its width. Therefore, if the bin is viewed across the width, as seen in FIG. 7, the bin has V-shaped bottom 32. The bin is supported by runners 34 which extend along the length of the bin. The bin itself is supported by various struts or legs 36 and angle struts 38 extending from the runners 34 to the V-shaped bottom 32. Also, the interior of the bin has tension member 40 to withstand the pressure of the load of grain therein. I prefer to construct the bin of sheet metal with struts and tension members according to conventional construction methods which will be well understood.

The bin 10 is equipped with wheels 42 to transport the bin for a short distance. (FIG. 4). Each wheel is mounted upon leg 44 which is mounted for vertical reciprocation within tube 46 which is secured to the framework of the storage bin 10, the framework consisting of the runners, legs, and the like. The wheels are mounted in tandem, two on each side, and the two legs 44 are connected by crossbeam 48. The crossbeam is connected to piston 50 of hydraulic cylinder 52 and the hydraulic cylinder 52 is connected to the runner 34. Conduits 54 provide hydraulic fluid from the power vehicle 12 so that the runners 34 may be raised from the ground by operation of the hydraulic cylinder 52 to move the bin from one field to another.

As stated before, the crossbeam 48 is connected to the legs 44. Bar 56 extends from one of the tubes to the other and, by conveniently placed holes placed through the bar 56 and the crossbesm 48, the wheels can be locked in the down position by pin 58 therethrough.

Hitch 60 on the forward end of the bin 10 provides for attachment of the bin to the power vehicle 12 to move the bin a short distance.

When the bin has grain therein, of course, the wheels are retracted and the hitch 60 detached from the power vehicle 12. In this position, tumble shaft 62 is attached to the power vehicle 12; thus, the power vehicle provides power to the storage bin through the tumble shaft 62. The tumble shaft is so called because it has U-bolts 64 at each end, permitting it to drive successfully even though the alignment may not be perfect.

Referring to FIG. 3, there may be seen a schematic representation of the drive. The tumble shaft 62 is connected through the U-bolt 64 to jack shaft 66 supported by a pair of bearings 68 within drive housing 70. Main stub shaft 72 is driven by chain drive 74. Main shaft 76 is located beneath the V-shaped bottom 32 and is connected by U-bolts 78 to the main stub shaft 72. The bin elevator is in the form of elevator auger 80 which extends from near the bottom of the V-shaped bottom 32 and is located at about mid-point of the bin 10. The auger is connected by electric clutch 82 and right-angle gear drive 84 to the main shaft 76. Therefore it may be seen that if the tumble shaft 62 is rotating and the electric clutch 82 is engaged, the elevator 80 will remove any grain at the center bottom of the bin.

Front coveyor or front auger 86 is driven by front auger chain drive 88. The front auger chain drive 88 drives from a sprocket on the stub shaft 72. Front auger electric clutch 90 forms a portion of the front conveyor activating means. It is attached to the chain drive 88 which forms a portion of the front conveyor drive means. When the electric clutch 90 is engaged, it activates the front conveyor 86 which moves any grain in the bin to the center portion or mid-point thereof wherein is located the elevator 80.

Rear stub shaft 92 is driven by chain drive 94 from the main shaft 76. Rear shaft 96 is driven through U-bolts 98 from the stub shaft 92. Rear conveyor or rear auger 100 is driven from the rear shaft 96 by chain drive 102 and electric clutch 104. The front auger 86, described above, and rear auger 100 are right and lefthanded augers so the grain is moved to the midpoint of the bin so the grain may be picked up by the elevator 80. As before, the clutch 104 forms a portion of the rear conveyor activating means. The clutch 104 is attached to the rear conveyor drive means of which chain drive 102 is a portion. The clutch is part of the means for activating the rear conveyor drive means.

Platform 106 is at the front, immediately above the drive housing 70. The platform is mounted at a convenient distance below top 108 of the bin 10 so that a person standing on the platform 106 can readily see inside the bin. FIG. 2 shows tarpaulin 110 covering the bin 10, however, it will be understood that in normal operation the tarpaulin will not be attached so that grain can readily be dumped into the bin and the operator standing on the platform 106 can see into the bin. I have found that if the platform is located about 1.5 meters or no more than 1.7 meters below the top of the bin, a person of average height can see inside the bin without any problem. For convenience, as may be seen in the drawing, ladders are provided to climb upon the platform 106 or to climb into the bin. A guard rail is also shown.

Electrical switches 112 are provided on the front of the bin 10 for energizing the electric clutches 82, 90, and 104. Thus, by selectively operating the switches 112, the grain may be augered or elevated from the bin into one of the road vehicles 14 or 16 by operating the switch that controls electric clutch 90 or the grain may be moved from the front of the bin to the mid-point, or by operating the switch that energizes electric clutch 104, the grain may be moved from the rear of the bin to the mid-point where it is picked up by the elevator auger 80.

Perforated tube 114 is mounted within the bin proper 30 immediately above the augers 86 and 100. The perforated tube 114 runs the length of the bin proper 30. The tube is supported by convenient supports 116 as will be well understood by those skilled in the art. The tube is connected by short, conical transition section 118 at the rear of the bin. As seen in FIG. 5, this rear transition 118 is located immediately above the chain housing 120 for the rear chain drive 102. The transition 118 is flanged so that electric fan unit 122 may be readily attached thereto by bolts. The electricity for the electric fan unit 122 is conviently supplied either by the power vehicle 12 or by an auxiliary portable generating unit 130. Referring to FIG. 2, it may be seen that the tarp 110 is vented as at 124 so that the air blown by the fan through the tube and the grain or crop may escape from the storage bin even though the tarp 110 is temporarily over the bin to prevent moisture as from rain falling therein. A heater (not shown) may be used in connection with the fan unit 122 if desired by the operator.

The front conveyor auger 86 and the rear conveyor auger 100 are covered by auger cover 126 as is customary in the art. At the midpoint of the bin, the perforated tube 114 has tube cover 128 thereover.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 8 field | 70 drive housing |
|---|---|
| 9 boundaries | 72 shaft stub |
| 10 bin, storage | 74 chain drive |
| 12 vehicle, power | 76 main shaft |
| 14 vehicle, road | 78 U-bolts |
| 16 vehicle, road | 80 auger, elevator |
| 18 combine | 82 clutch, electric |
| 20 hopper, collector | 84 gear drive |
| 22 auger | 86 auger, front conveyor |
| 24 grain cart | 88 chain drive, fr.auger |
| 26 vehicle, towing | 90 clutch, elec.fr.auger |

-continued

| 28 cart elevator | 92 stub shaft, rear |
|---|---|
| 30 bin, proper | 94 chain drive |
| 32 V-bottom | 96 shaft, rear |
| 34 runners | 98 U-bolts |
| 36 struts, legs | 100 auger, rear convey |
| 38 angle struts | 102 chain drive |
| 40 members, tension | 104 clutch, electric |
| 42 wheels | 106 platform |
| 44 leg | 108 top |
| 46 tube | 110 tarp |
| 48 cross beam | 112 switches |
| 50 piston | 114 perforated tube |
| 52 cylinder, hydraulic | 116 supports |
| 54 conduits | 118 transition |
| 56 bar | 120 housing, rear |
| 58 pin | 122 fan unit |
| 60 hitch | 124 vents |
| 62 shaft, tumble | 126 auger cover |
| 64 U-bolts | 128 tube cover |
| 66 shaft, jack | 130 auger generator |
| 68 bearings | |

I claim as my invention:

1. A structure for grain storage comprising:
   (a) a bin having a length several times the width,
   (b) said bin supported by runners extending along the length thereof,
   (c) said bin having a V-shaped bottom across the width,
   (d) an elevator extending from the V-shaped bottom at about the midpoint of the length,
   (e) a rear conveyor extending from the rear of the bin to the elevator,
   (f) a front conveyor extending from the front of the bin to the elevator,
   (g) elevator drive means attached to the elevator for driving same,
   (h) elevator activating means attached to the elevator drive means for activating same,
   (j) front conveyor drive means attached to the front conveyor for driving same,
   (k) front conveyor activating means attached to the front conveyor drive means for activating same,
   (m) rear conveyor drive means attached to the rear conveyor for driving same, and
   (n) rear conveyor activating means attached to the rear conveyor drive means for activating same.

2. The invention as defined in claim 1 with additional limitations of
   (o) a perforated tube running the length of the bin
   (p) within the bin immediately above said front and back conveyors,
   (q) a fan outside the bin,
   (r) the fan connected to the perforated tube so that dry air may be blown through the tube and its perforations and through the grain.

3. The invention as defined in claim 1 with additional limitations of
   (o) a plurality of wheels,
   (p) means attaching the wheels to said runners for raising and lowering the wheels whereby said runners may be raised above the ground,
   (g) a hitch on one end of the structure whereby the structure may be attached to a vehicle and towed by the vehicle.

4. The invention as defined in claim 1 with additional limitations of
   (o) a drive shaft extending below the bin from the front of the bin to at least the elevator,
   (p) said drive shaft drivingly connected to the elevator, thus forming a portion of said means for driving said elevator, (q) a tumble shaft,
(r) said tumble shaft being adapted to be attached to a source of power to furnish power to the elevator and conveyors,
(s) an elevator clutch,
(t) said elevator clutch operatively connecting the elevator and the drive shaft,
(u) said elevator clutch forming a portion of said actuating means for activating the drive means for the elevator,
(v) a front clutch interconnecting said main drive shaft and said front conveyor drive means, thus forming a portion of said front conveyor actuating means, and
(w) a rear clutch interconnecting said main drive shaft and said rear conveyor drive means, thus forming a portion of said rear conveyor activating means.

5. The invention as defined in claim 4 wherein additional limitations of
(x) a perforated tube running the length of the bin
(y) within the bin immediately above said front and back conveyors,
(z) a fan outside the bin,
(aa) the fan connected to the perforated tube so that dry air may be blown through the tube and its perforations and through the grain.

6. The invention as defined in claim 4 with an additional limitation of
(x) each of said clutches being controlled by an electric clutch.

7. The invention as defined in claim 6 with additional limitations of
(y) a platform on the outside of said bin within about 1.7 meters of the top of said bin so that a person standing on said platform may see the inside of the bin, and
(z) switches electrically connected to said electric clutches attached to said bin adjacent said platform so that they may be operated therefrom.

8. The invention as defined in claim 7 with additional limitations of
(aa) a perforated tube running the length of the bin
(bb) within the bin immediately above said front and back conveyors,
(cc) a fan outside the bin,
(dd) the fan connected to the perforated tube so that dry air may be blown through the tube and its perforations and through the grain.

9. The invention as defined in claim 8 with additional limitations of
(ee) a plurality of wheels,
(ff) means attaching the wheels to said runners for raising and lowering the wheels whereby said runners may be raised above the ground,
(gg) a hitch on one end of the structure whereby the structure may be attached to a vehicle and towed by the vehicle.

* * * * *